United States Patent [19]

Raidel

[11] Patent Number: 4,718,692
[45] Date of Patent: Jan. 12, 1988

[54] HEAVY VEHICLE SUSPENSION WITH UNITIZED NARROW PROFILE BOLSTER BEAM HANGER ASSEMBLY AND OUTBOARD SPRING MOUNT

[76] Inventor: John E. Raidel, Rte. 1, Box 400-N, Springfield, Mo. 65804

[21] Appl. No.: 916,378

[22] Filed: Oct. 7, 1986

Related U.S. Application Data

[63] Continuation of Ser. No. 572,892, Jan. 23, 1984, abandoned, which is a continuation-in-part of Ser. No. 502,496, Aug. 29, 1983, Pat. No. 4,529,224, which is a continuation of Ser. No. 266,006, May 21, 1981, abandoned.

[51] Int. Cl.$^4$ ............................................. B60G 11/26
[52] U.S. Cl. ..................................... 280/713; 280/711
[58] Field of Search ............... 280/683, 685, 689, 702, 280/711, 713, 724, 725, 781, 788, 104

[56] References Cited

U.S. PATENT DOCUMENTS

| | | | |
|---|---|---|---|
| 2,869,891 | 1/1959 | Venditty | 280/124 |
| 2,903,256 | 9/1959 | Weiss | 267/15 |
| 2,941,817 | 6/1960 | Benson | 280/124 |
| 3,033,591 | 5/1962 | Ward | 280/124 |
| 3,547,215 | 12/1970 | Bird | 280/124 |
| 3,794,343 | 2/1974 | Hickman | 280/124 |
| 3,801,086 | 4/1974 | Raidel | 267/67 |
| 3,964,764 | 6/1976 | Rickardsson | 280/702 |
| 4,181,323 | 1/1980 | Raidel | 280/711 |
| 4,248,455 | 2/1981 | Manning | 280/711 |
| 4,273,357 | 6/1981 | Pashkow | 280/697 |

FOREIGN PATENT DOCUMENTS 650987 10/1962 Canada ................................. 280/71

Primary Examiner—John J. Love
Assistant Examiner—Ross Weaver
Attorney, Agent, or Firm—Rogers, Howell, Moore & Haferkamp

[57] ABSTRACT

A suspension for a heavy-duty vehicle includes a narrow profile skirt-type hanger with a unitized bolster beam extending laterally beneath the chassis between hangers at opposite sides of the vehicle, an axle seat assembly rigidly secured to the axle with a torque arm resiliently connected thereto at a pair of spaced-apart locations, the forward end of the torque arm being pivotally mounted to the bolster beam at the hanger assembly, and an outboard mounted air spring mounted outboard of the chassis between the axle seat assembly and an upper spring mount. A second embodiment of the suspension includes an overslung axle seat assembly rigidly secured to a trunnion rod, offset from a stub-axle supporting the wheel. A second bolster beam extends laterally between axle seat assemblies at opposite sides of the vehicle, such that both the first and second bolster beams and the trunnion rod extending laterally underneath the chassis between like suspensions on the opposite side of the vehicle. The hanger and torque arm are recessed inwardly relative to the air spring.

14 Claims, 8 Drawing Figures

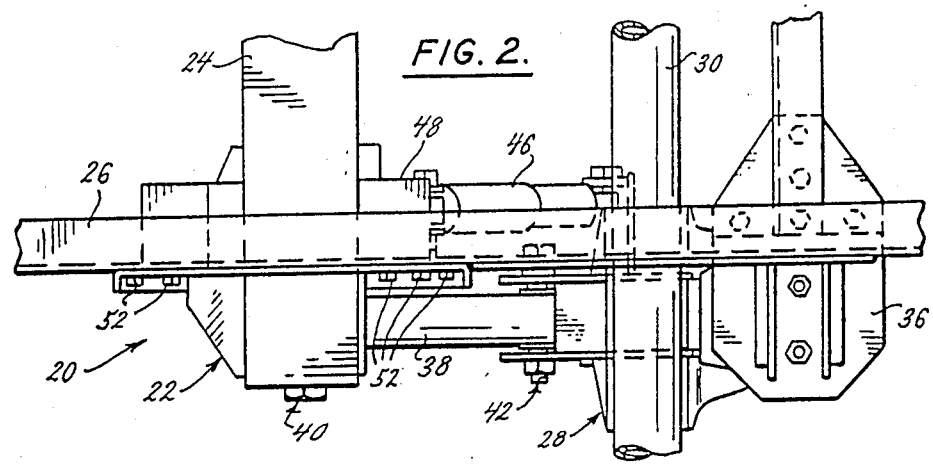
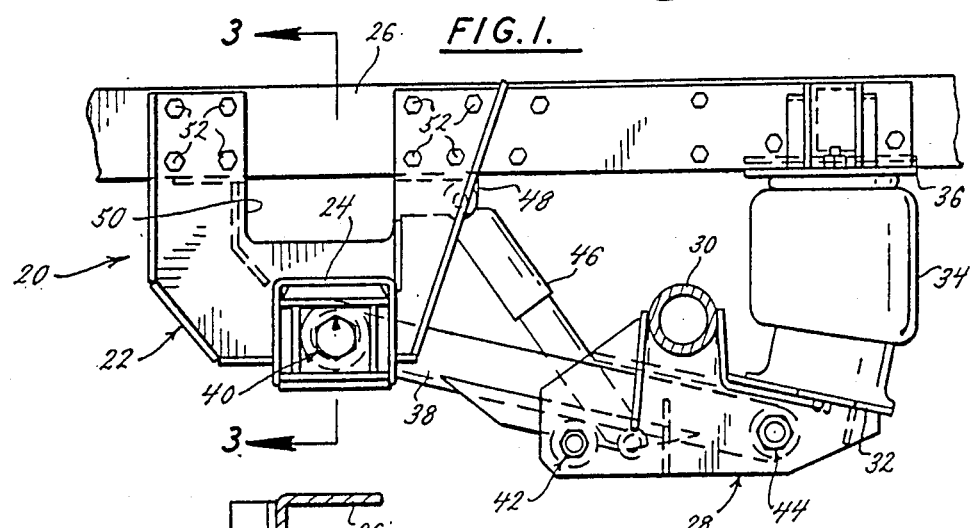
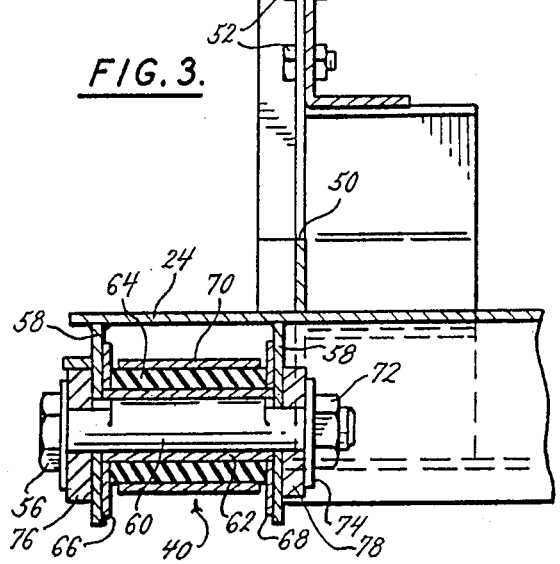
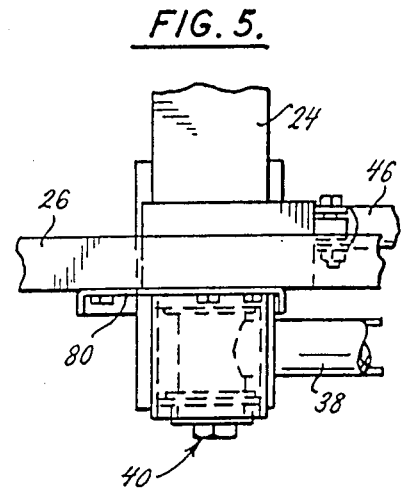

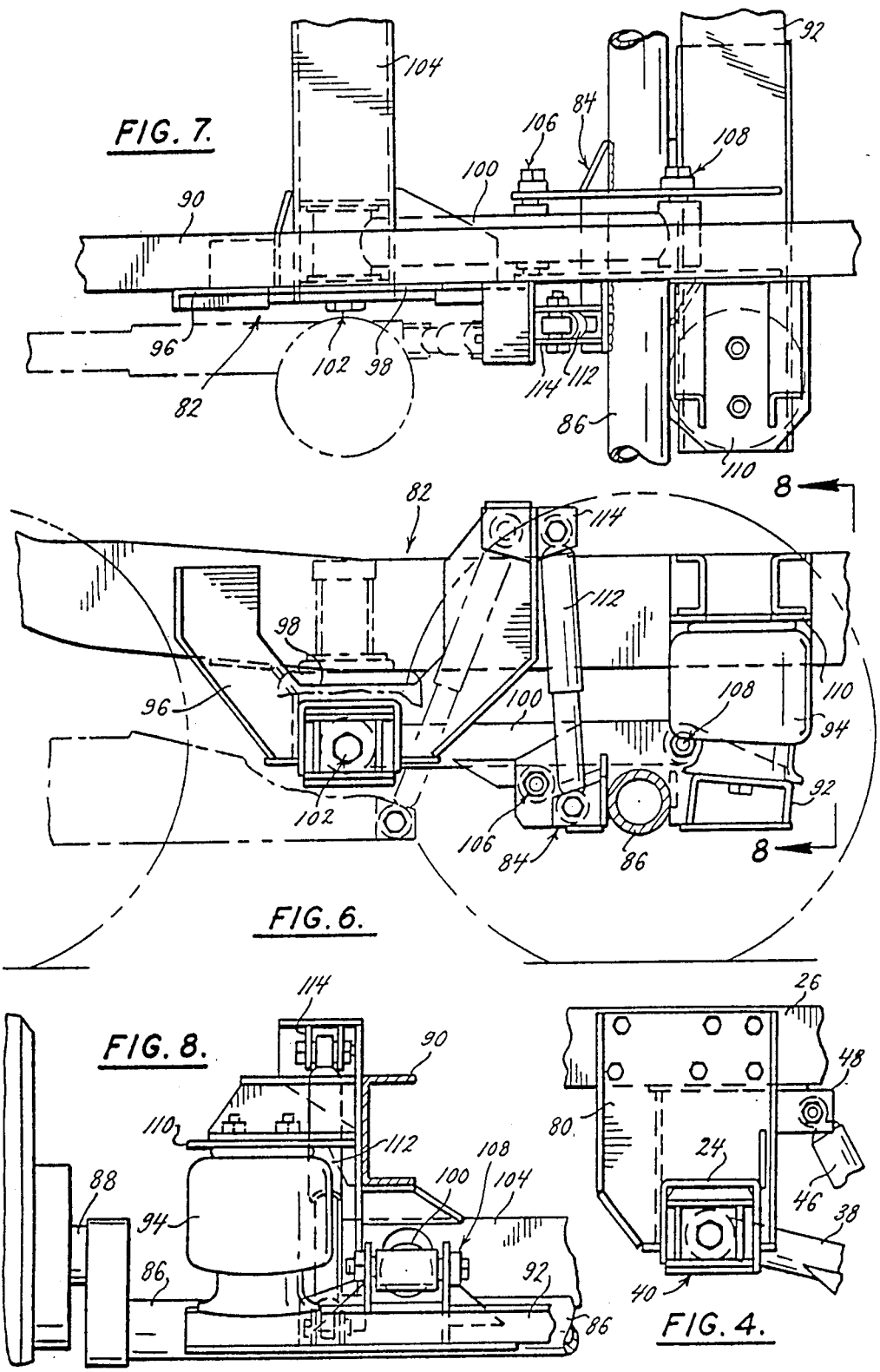

HEAVY VEHICLE SUSPENSION WITH UNITIZED NARROW PROFILE BOLSTER BEAM HANGER ASSEMBLY AND OUTBOARD SPRING MOUNT

BACKGROUND AND SUMMARY

This application is a continuation of Ser. No. 572,892 filed Jan. 23, 1984 now abandoned, which is a continuation-in-part of Ser. No. 502,496 filed Aug. 29, 1983, now U.S. Pat. No. 4,529,224, which is a continuation of Ser. No. 266,006 filed May 21, 1981, now abandoned.

The inventor herein is also the inventor of many other suspension systems. An example is that shown in the parent application Ser. No. 502,496 which discloses a suspension providing mounting of the air springs outboard of the main chassis rail which improves the stability and ride of the vehicle, as explained more fully therein. Another of the inventor's prior work is shown in U.S. Pat. No. 3,801,086 issued Apr. 2, 1974, the disclosure of which is incorporated herein by reference. In the suspension shown in that patent, a hanger assembly depends downwardly from the chassis rail, a torque arm is pivotally mounted to and extends between the hanger assembly and a beam fixedly secured to the axle of the vehicle, the torque arm being resiliently mounted at each of two spaced apart points on the beam. An air spring is mounted to and extends between the beam and the chassis, and a shock absorber is also pivotally mounted to and extends between the chassis or hanger and the beam. In the patented suspension, means are provided for allowing for oscillation of the axle as caused by relative up and down movement by one end of the axle with respect to the other under various load conditions, and yet provides an exceptionally stable and comfortable ride.

The present invention incorporates many of the features of these prior inventions, and also permits their adaptability to vehicles requiring limited clearance.

A first embodiment the suspension of the present invention includes a narrow profile hanger assembly, a transversely extending bolster beam, and an axle seat spring platform for outboard mounting of the spring. The narrow profile, or skirt-type hanger assembly permits close fitting with other structure, and the unitized bolster beam provides a convenient support for a bushing assembly to pivotally and resiliently mount the forward end of the torque arm. By utilizing this novel skirt-type unitized hanger and bolster beam, the suspension of the present invention may be easily adapted to vehicles having existing suspensions with leaf springs or the like. A cutout may be made in the hanger to increase access to other components adjacent the suspension. In this first embodiment of the invention, both the torque arm and spring are aligned outside the chassis rail of the vehicle from which the hanger depends. The axle seat assembly rigidly secured to the axle provides two spaced apart mountings for resiliently connecting the torque arm and provides the advantages disclosed and claimed in the inventor's prior patented suspension mentioned above.

In a second embodiment of the invention, an overslung axle seat is rigidly secured to a trunnion rod which extends laterally underneath the chassis and which is offset downwardly from the axle, thereby providing a greater clearance from the chassis to facilitate mounting of the suspension. Additionally, a second bolster beam extends laterally beneath the chassis to a like second suspension on the opposite side of the vehicle, this second bolster beam being mounted between the axle seats of the suspensions. This helps stabilize the suspension and also provides greater support for the outboard mounting of the air spring. A torque arm is pivotally connected to a hanger and extends rearwardly to the axle seat where it is resiliently connected at each of two spaced apart locations as taught by U.S. Pat. No. 3,801,086 as mentioned above. In this embodiment, the torque arm and its pivotal connection to the hanger are generally beneath and generally aligned with the chassis rail, and the air spring is mounted outboard of the chassis rail. Therefore, the hanger and torque arm are recessed inwardly relative to the air spring to allow clearance for suspension components of another axle on a tandem axle vehicle. By use of the narrow profile skirt-type hanger assembly, this second embodiment may be spaced very close to a wide base air spring suspension as disclosed and claimed in the parent application such as would be used on an adjacent axle of a tandem axle vehicle. Thus, the many features and benefits of the wide base air spring suspension can be realized for both of a pair of axles forming a tandem.

While some of the features and advantages of the suspension of the present invention have been mentioned, a more complete understanding and appreciation for the invention may be gained by reviewing the drawings and description of the preferred embodiment which follows.

BRIEF DESCRIPTION OF THE DRAWINGS

FIG. 1 is a side view of the first embodiment of the suspension of the present invention;

FIG. 2 is a top view of the first embodiment;

FIG. 3 is a partial cross-sectional view taken along the plane of line 3—3 in FIG. 1;

FIG. 4 is a partial view of an alternative narrow profile skirt-type hanger assembly as might be used with the first embodiment;

FIG. 5 is a top view of the alternative narrow profile skirt-type hanger shown in FIG. 4;

FIG. 6 is a side view of the second embodiment of the suspension of the present invention;

FIG. 7 is a top view of the second embodiment of the suspension of the present invention with and adjacent wide base air spring suspension shown in phantom; and FIG. 8 is a rear view of the second embodiment taken along the plane of line 8—8 in FIG. 6.

DETAILED DESCRIPTION OF THE PREFERRED EMBODIMENT

As shown in FIGS. 1 and 2, the first embodiment 20 of the present invention includes generally a narrow profile skirt-type forward hanger 22 with a unitized bolster beam 24 extending transversely beneath the chassis rail 26. An axle seat assembly 28 is fixedly secured to the axle 30 and has an integral spring platform 32 to mount the lower end of an air spring 34. The upper spring mount 36 is comprised of a laterally extending bracket assembly which bolts to the chassis rail 26 to provide outboard mounting of air spring 34. A torque arm 38 is pivotally connected at its forward end to the unitized bolster beam 24 by bushing assembly 40, and is also resiliently connected to axle seat assembly 28 at each of two spaced apart positions by bushing assemblies 42, 44 respectively. A shock absorber 46 is also pivotally connected to axle seat assembly 28 and a chassis member 48. A cutout 50 can be provided in the forward hanger assembly 22 to provide access to other suspension components.

As shown in FIGS. 1 and 3, the narrow profile skirt-type forward hanger assembly 22 is bolted by bolts 52 to the chassis rail 26 and extends downwardly therefrom where, at the lower portion thereof, it is welded to one end of the laterally extending bolster beam 24. The other end of the bolster beam 24 is secured to a hanger of a like suspension at the opposite side of the vehicle. As shown in both FIGS. 1 and 3, the bushing assembly 40 provides an adjustable mount for the forward end of the torque arm 38 within the unitized bolster beam 24 at a location generally outboard of the chassis rail 26. The bushing assembly 40 is generally comprised of a center bolt 56 which extends through a pair of spaced bracket members 58, bolt 56 having an eccentric shank 60 to adjust the mounting of torque arm 38. An inner sleeve 62 surrounds shank 60, with an elastomeric spacer member 64 surrounding inner sleeve 62, and washers 66, 68 mounted at either end of elastomeric spacer 64. The outer sleeve 70 forms part of torque arm 38. A nut 72 and washer 74 secure center bolt 56 to spaced brackets 58, with spacer plates 76, 78 at either end thereof.

Thus, with this embodiment the torque arm, including its forward pivotal mount, and air spring are mounted generally outboard of the chassis rail with a narrow profile hanger stabilized by a transverse bolster beam.

As shown in FIGS. 4 and 5, an alternate design narrow profile skirt-type hanger 80 can be used in place of the hanger 22 depicted in FIGS. 1–3. The principal difference between them is the absence of cutout 50, and the shorter longitudinal length, with hanger 80.

The second embodiment 82 of the suspension of the present invention is shown in FIGS. 6–8 and contains several principal differences. Among these is that axle seat assembly 84 is rigidly mounted to a trunnion rod 86 which is offset downwardly from stub axle 88 and which extends laterally beneath the chassis rail 90 to connect to the axle seat of a like suspension on the opposite side of the vehicle. Additionally, a second bolster beam 92 is unitized with the axle seat assembly 84 and extends from beneath the outboard mounted air spring 94 laterally underneath the chassis to the axle seat of a second like suspension on the opposite side of the vehicle. Additionally, a narrow profile skirt-type forward hanger 96, with a cutout 98, accommodates adjacent suspension components for that of a tandem axle (portions shown in phantom), and also pivotally supports the forward end of a torque arm. The hanger and torque arm, including its forward pivotal mount, are located generally beneath the chassis rail and are recessed inwardly relative to the air spring to provide clearance for the suspension of a forward axle on a tandem axle vehicle.

The second embodiment 82 also includes many of the same or similar structures of the first embodiment 20 to perform the same or similar function. For example, a torque arm 100 is pivotally mounted by a forward bushing assembly 102 to a unitized bolster beam 104, bushing assembly 102 being very much like bushing assembly 40 of the first embodiment. Additionally, a pair of bushing assemblies 106, 108 resiliently mount the torque arm 100 to axle seat assembly 84 at a pair of spaced apart positions, much the same as the bushings 42, 44 of the first embodiment. The upper spring mount 110 is secured to and laterally extends from the chassis rail 90 to facilitate outboard mounting of air spring 94. A shock absorber 112 is pivotally connected to the axle seat assembly 84 and to a upper shock mount 114 secured to chassis rail 90.

The second embodiment 82 is particularly adapted for use with the second axle of a tandem pair where close tolerances are imposed on the suspension due to the desired close spacing of the axles, and the location of suspension components of the first axle. Thus, the narrow profile skirt-type hanger with the unitized bolster beam, and the recessing of the hanger, torque arm, and forward pivotal connection of the torque arm, provide a suspension that readily accommodates close placement of the second axle in a tandem axle vehicle while also providing the advantages of an outboard air spring suspension. These features combined with the other features, such as those allowing for axle oscillation to give the added advantages of a stable and comfortable ride. The overslung trunnion design allows for close placement of the axle relative the chassis, and additional stability is provided by the trunnion rod and a second unitized bolster beam secured to the axle seat assembly, both of which extend laterally beneath the vehicle to a second like suspension on the opposite side thereof.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What I claim is:

1. A suspension system for a vehicle of the kind having an axle and a frame including transversely spaced first and second longitudinal rails on opposite sides of the vehicle, comprising a transverse bolster beam, hanger means supported from and depending downwardly from the first rail, the hanger means comprising a plate-like skirt having a relatively long profile in a longitudinal direction and having a narrow profile in a transverse direction, thereby minimizing transverse projections of the skirt to allow clearance of other vehicle components on opposite sides of the skirt, means for connecting the bolster beam to the skirt to support the bolster beam from the skirt and from the skirt of a like hanger means supported from and depending downwardly from the second rail, the connecting means of the bolster beam to the skirt being spaced below the rails, a torque beam having forward and rearward ends, means connected directly to the bolster beam and directly to the forward end of the torque beam for supporting the torque beam from the bolster beam while allowing rocking movement of the torque beam within a generally longitudinal plane, a lower spring seat on the rearward end of the torque beam and positioned laterally outboard of the first rail, an upper spring seat supported from and projecting laterally outward from the first rail, means to connect the lower and upper spring seats to opposite sides of an air spring, and means for connecting the torque beam to the axel at a location intermediate the ends of the torque beam, the means for supporting the torque beam from the bolster beam comprising an elastomeric bushing, and including a pair of parallel longitudinally oriented and transversely spaced mounting plates fixed to the bolster beam, the elastomeric bushing being connected to and extending between the mounting plates.

2. The suspension system of claim 1 wherein the bolster beam has an integral end section extending outboard of the skirt and the mounting plates are fixed to said section of the bolster beam to locate the torque beam outboard of the first rail.

3. A suspension system for a vehicle of the kind having an axle and a frame including transversely spaced first and second longitudinal rails on opposite sides of the vehicle, comprising a transverse bolster beam, hanger means supported from and depending downwardly from the first rail, the hanger means comprising a plate-like skirt having a relatively long profile in a longitudinal direction and having a narrow profile in a transverse direction, thereby minimizing transverse projections of the skirt to allow clearance of other vehicle components on opposite sides of the skirt, means for connecting the bolster beam to the skirt to support the bolster beam from the skirt and from the skirt of a like hanger means supported from and depending downwardly from the second rail, the connecting means of the bolster beam to the skirt being spaced below the rails, a torque beam having forward and rearward ends, means connected directly to the bolster beam and directly to the forward end of the torque beam for supporting the torque beam from the bolster beam while allowing rocking movement of the torque beam within a generally longitudinal plane, a lower spring seat on the rearward end of the torque beam and positioned laterally outboard of the first rail, an upper spring seat supported from and projecting laterally outward from the first rail, means to connect the lower and upper spring seats to opposite sides of an air spring, and means for connecting the torque beam to the axel at a location intermediate the ends of the torque beam, the torque beam comprising a torque arm and an axle seat assembly, a pair of bushings forward and rearward respectively of the axle for connecting the axle seat assembly to the torque arm, the means for connecting the torque beam to the axle comprising means for connecting the axle seat to the axle, and including a plate extending between and joined to the skirt and the upper spring seat for unitizing the hanger, the bolster beam, the torque beam, and the upper spring seat.

4. The suspension system of claim 2 including an opening through the skirt to provide access to vehicle components located inboard of the skirt.

5. The suspension system of claim 2 wherein the bolster beam is a channel member having a top with sides at right angles to it, and the mounting plates are rectangular.

6. A suspension system for a vehicle of the kind having an axle and a frame including longitudinally extending first and second side rails, comprising a hanger formed of a substantially vertical hanger plate, the hanger plate comprising generally vertical forward and rearward legs defining the sides of an access space between them, the legs having upper and lower ends, a longitudinally extending generally horizontal cross member integral with and extending between the lower ends of the legs and defining the lower extent of the access space, means to connect the upper ends of the legs to the first rail with the cross member spaced below the first rail whereby the access space is below the first rail and its upper extent is defined by the first rail, the forward and rearward legs having generally upright forward and rearward extremes, front and rear flanges integral with and located at the respective forward and rearward extremes of the front and rear legs, the flanges being much narrower in a transverse direction than long in a generally upright direction whereby the flanges stiffen and strengthen the hanger plate without significantly intruding into an area transverse of the hanger plate to thereby minimize interference with other vehicle components located transverse of the hanger plate, a bolster beam formed with a generally horizontal wall integral with two spaced generally vertical walls, the hanger plate having surround edges for contacting the horizontal and vertical walls of the bolster beam, the bolster beam being transverse of the hanger plate and being welded to the hanger plate at the surround edges thereof and likewise to a like hanger plate connected to the second rail, the bolster beam including an extension projecting outboard of the hanger plate, a pair of transversely spaced mounting plates welded to the bolster beam and positioned between the vertical walls of the bolster beam, a pivot support mounted to and extending between the mounting plates, a torque arm and axle seat assembly having a forward end formed with a pivot mount and a rearward end formed with a lower spring seat and having an axle seat therebetween, means to connect the pivot mount to the pivot support, an upper spring seat, means to connect the upper spring seat to the first rail, an air spring having upper and lower sides, means to connect the upper and lower sides of air springs to the respective upper and lower spring seats, and means to connect the axle seat to the axle.

7. The suspension system of claim 6 wherein the upper and lower spring seats are outboard of the first rail.

8. The suspension system of claim 6 wherein the torque arm and axle seat assembly comprises two components conected together by bushings, and the pivot mount and axle seat are on separate ones of said two components.

9. The suspension system of claim 6 including plate means extending beween and connected to the upper spring seat and the rearward hanger plate leg, and means to connect the plate means to the first rail.

10. In a vehicle suspension for a vehicle having a frame and an axle: a transverse bolster beam, hanger means fixed to the frame to dispose that bolster beam at a level below the level of the frame of the vehicle, the bolster beam extending transversely of the vehicle and having an end fixed to the hanger and having an opposite end fixed to a like hanger of a like suspension on the opposite side of the vehicle, a torque arm, means for connecting the torque arm to the axle; a spring; means for connection of the torque arm to the spring; means to connect the torque arm to the transverse bolster beam; the axle connecting means being located between the spring and the hanger; the bolster beam having spaced plates extending therefrom on opposite sides of the torque arm, the plates being integrally formed with the bolster beam, and an elastic rocking pivot means between the plates and the torque arm for connection of the torque arm to the bolster beam.

11. The suspension of claim 10 wherein the hanger is U-shaped when viewed from the side of the vehicle with its legs adapted to be secured to the frame of the vehicle and to depend therefrom, and the opening of the U offering access to mechanism on the vehicle inside of the hanger.

12. The suspension of claim 10 wherein the torque arm is part of a sub-assembly including an air spring mount and there is an air spring connected to the torque arm assembly, and the mount has a laterally projecting portion to support the spring in an outrigger manner outside the lateral limits of the frame.

13. The mechanism of claim 12 wherein the torque arm is at least substantially within the lateral limits of the frame.

14. The suspension of claim 10 wherein the pivotal mounting means for the forward end of the torque arm is offset outboard of the chassis rail.

* * * * *